United States Patent [19]
Kajimoto et al.

[11] Patent Number: 5,920,367
[45] Date of Patent: Jul. 6, 1999

[54] LIQUID CRYSTAL DISPLAY DEVICE

[75] Inventors: Koichi Kajimoto, Tenri; Takeshi Seike, Kitakatsuragi-gun, both of Japan

[73] Assignee: Sharp Kabushiki Kaisha, Osaka, Japan

[21] Appl. No.: 08/949,128

[22] Filed: Oct. 10, 1997

[30] Foreign Application Priority Data

Nov. 12, 1996 [JP] Japan ................................. 8-300116
Aug. 28, 1997 [JP] Japan ................................. 9-233101

[51] Int. Cl.$^6$ ..................... G02F 1/1333; G02F 1/1335
[52] U.S. Cl. ............................. 349/162; 349/114; 349/96
[58] Field of Search ................... 349/51, 62, 96, 349/113, 162, 114, 68

[56] References Cited

U.S. PATENT DOCUMENTS

| | | | |
|---|---|---|---|
| 4,637,687 | 1/1987 | Haim et al. | 349/114 |
| 4,657,348 | 4/1987 | Ziegler | 349/114 |
| 5,724,112 | 3/1998 | Yoshida et al. | 349/114 |

FOREIGN PATENT DOCUMENTS 7-333598  12/1995  Japan .

*Primary Examiner*—William L. Sikes
*Assistant Examiner*—Dung Nguyen
*Attorney, Agent, or Firm*—Dike, Bronstein, Roberts & Cushman, LLP; David G. Conlin

[57] ABSTRACT

In a liquid crystal display device of the present invention, a white plate light source such as a cool cathode fluorescent tube is provided on a back surface of a liquid crystal cell, i.e., on a surface opposite to a displaying surface of the liquid crystal cell. On a surface opposite to the displaying surface of the liquid crystal panel, a polarizing plate-equipped semitransmitting reflecting plate is provided. The liquid crystal panel is composed of active elements such as MIM (Metal-Insulator-Metal) elements or TFTs (Thin Film Transistors). With this arrangement, discharge of a charge is suppressed by switching of the active element when a voltage is applied to two types of electrodes sandwitching a liquid crystal layer. By setting reflectance and transmittance of the polarizing plate-equipped semitransmitting reflecting plate such that contrast of the liquid crystal panel is higher when the cool cathode fluorescent tube is not lighted than when the cool cathode fluorescent tube is lighted, it is ensured that visibility both in a reflecting mode and a transmitting mode are improved.

12 Claims, 10 Drawing Sheets

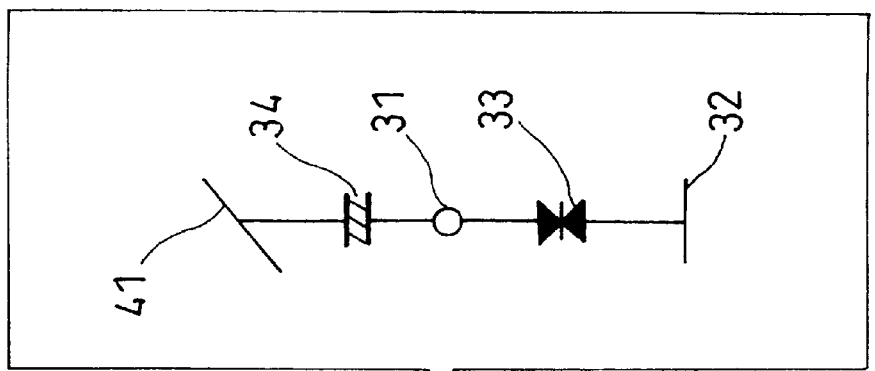
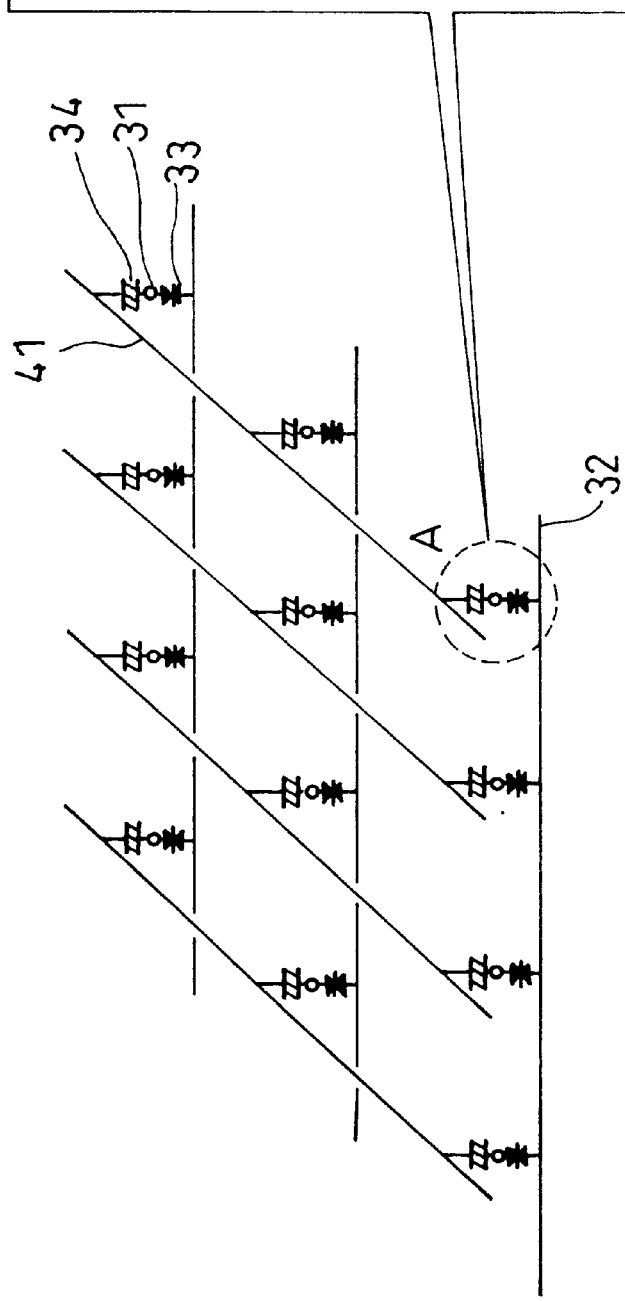

LIQUID CRYSTAL DISPLAY DEVICE

FIELD OF THE INVENTION

The present invention relates to a liquid crystal display device, and more particularly to a semitransmitting-type liquid crystal display device having transmitting type and reflecting type displaying systems.

BACKGROUND OF THE INVENTION

In recent years, due to its light weight and low power consumption, a liquid crystal display device has been used in a variety of fields. Specifically, the liquid crystal display device, for example, is used as (1) a display device such as an office automation equipment (for example, word processor and personal computer), and an audio and visual equipment dealing with an image, (2) an information display device for use in (a) instruments of a car and an air plane etc. and (b) portable information terminals, and (3) an information display device for use in a watch and a measuring device.

Generally, the liquid crystal display device itself is non-light emitting. Thus, by providing the liquid crystal display device with illuminating means of some sort or means serving the same function, it is possible to adopt the liquid crystal display device as a display which is available in various forms. The liquid crystal display device can be broadly classified into three types on the basis of the difference in illuminating methods: a transmitting type, a reflecting type, and a semitransmitting type.

A transmitting-type liquid crystal display device is provided with illuminating means such as (1) a small fluorescent lamp, e.g., a cool cathode fluorescent tube, and (2) an EL (electroluminescence) light-emitting element. Such illuminating means is provided on the back surface of a liquid crystal display element, namely, the illuminating means are provided on a surface opposite to the displaying surface of the liquid crystal display device. With this arrangement, the transmittance of the light from the illuminating means is adjusted by the liquid crystal display element such that the light is transmitted to the front surface of a display panel, thereby displaying an image on the displaying surface of the liquid crystal display element. Thus, since the liquid crystal display device is provided with illuminating means, such liquid crystal display device can be used in a dark environment in the same manner as a self-light-emitting element. Further, by controlling the intensity of the light from the illuminating means, it is possible to adjust the brightness of the display screen.

However, in the liquid crystal display device of this type, even when used in a luminous environment, the illuminating means is required to carry out illumination with certain intensity. For this reason, even though the liquid crystal display device is, in general, said to have low power consumption, the power consumption is increased. Also, because it is required to provide a power source for supplying power to the illuminating means, the liquid crystal display device has a drawback in that the liquid crystal display device becomes large and heavy.

On the other hand, a reflective-type liquid crystal display device uses, as reflecting illumination, surrounding light such as the sun light and indoor illumination which are available in the environment where the reflective-type liquid crystal display device is used. Hence, the reflective-type liquid crystal display device is provided with reflecting means for reflecting the surrounding light. The reflecting means is provided on the back surface of the liquid crystal display element. Note that, the reflecting means is composed of, for example, (1) aluminium (Al) or Silver (Ag) and (2) a film substrate. Thus, in the reflective-type liquid crystal display device, unlike the transmitting-type liquid crystal display device which is required to be provided with illuminating means, it is not required to provide illuminating means. As a result, in the reflective-type liquid crystal display device, it is possible to lower the power consumption, also it is possible to realize a light, thin liquid crystal display device with ease which is a characteristic of a liquid crystal display device.

However, since the reflective-type liquid crystal display device uses the surrounding light, the brightness of the display is largely influenced by the lighting condition of the environment where the reflective-type liquid crystal display device is used. That is to say, for example, when the reflective-type liquid crystal display device is used in a dark environment, it becomes difficult to see the display. For this reason, the reflective-type liquid crystal display device is not suitable in a dark environment.

In contrast, a semitransmitting-type liquid crystal display device, like the transmitting-type, is provided with illuminating means such as (1) the small fluorescent lamp, e.g. the cool cathode fluorescent tube, and (2) an EL light-emitting element. The illuminating means is provided on the back surface of the liquid crystal display element, namely, the illuminating means is provided on a surface opposite to the displaying surface of the liquid crystal display element. Between the illuminating means and the liquid crystal display element, there is provided a semitransparent reflecting plate such as a magic mirror. The main portion of the semitransparent reflecting plate is made of (a) a scattering plate such as a semitransparent plastic sheet, (b) a scattering plate in which a meshed metal reflecting film has been patterned on the scattering plate of (a), or (c) a scattering plate on which pearl resin etc. has been spread.

With this arrangement, in a luminous environment, displaying is carried out without lighting of the illuminating means, but by the reflection of surrounding light such as indoor illumination by the semi-reflecting plate. Namely, in this case, the surrounding light is used as reflecting illumination. Note that, displaying without lighting of the illuminating means in this manner will be referred to as a reflecting mode hereinafter.

In contrast, in a dark environment, displaying is carried out by lighting of the illuminating means. Namely, in this case, the light from the illuminating means is used which transmits through the semitransmitting reflecting plate. Note that, displaying by lighting of the illuminating means in this manner will be referred to as a transmitting mode hereinafter.

As described, since the liquid crystal display device of this type is provided with both the transmitting type and the reflecting type displaying systems, a suitable displaying system can be adopted in accordance with a lighting environment so as to complement each other the shortcoming of each displaying system. Namely, the semitransmitting-type liquid crystal display device has an advantage in that the power consumption is low, and the device is suited for use not only in a luminous environment but also in a dark environment.

Incidentally, the characteristic of the semitransmitting-type liquid crystal display device is defined fixedly by setting of the transmittance and the reflectance of a material of the semitransmitting reflecting plate. That is to say, in the case of using, for example, a semitransmitting reflecting plate which has been set so as to have high transmittance and low reflectance, the illuminating characteristic of the liquid crystal display device becomes transmission-oriented. On the other hand, in the case of using, for example, a semi-transmitting reflecting plate which has been set so as to have low transmittance and high reflectance, the illuminating characteristic of the liquid crystal display device becomes reflection-oriented. Note that, in the semitransmitting-type liquid crystal display device, ignoring the light loss due to scattering in the semitransmitting reflecting plate, the transmittance and the reflectance substantially trade off with each other. Recently, a semitransmitting-type liquid crystal display device which is highly transmitting as well as highly reflecting has been developed; however, the transmittance and the reflectance still trade off with each other.

A semitransmitting-type liquid crystal display device, for example, adopting the STN (Super Twisted Nematic) system is designed, considering the visibility in both the transmitting mode and the reflecting mode, so that the respective contrast in the transmitting mode and in the reflecting mode are substantially the same. Therefore, in the semitransmitting-type liquid crystal display device adopting the STN system, both the transmitting type and the reflecting type displaying systems can be adopted. Note that, the contrast refers to the ratio of respective luminance values when displaying white and when displaying black, while driving the liquid crystal display element.

However, in the semitransmitting-type liquid crystal display device adopting the STN system, due to its arrangement, if a large number of scanning lines are employed, a charge stored during a period of (a) applying a voltage to two transparent electrodes sandwitching the liquid crystal layer and (b) applying the next voltage to the two transparent electrodes is discharged so as to lower the contrast. Also, the contrast in the transmitting mode is lowered compared with, for example, the transmitting-type liquid crystal display device or the reflecting type liquid crystal display device. This presents a problem in that the displaying becomes dark in the reflecting mode and pale in the transmitting mode such that the visibility of the displayed image becomes poor.

SUMMARY OF THE INVENTION

It is an object of the present invention to provide a liquid crystal display device which permits to improve visibility both in a transmitting mode and the reflecting mode irrespective of surrounding brightness.

In order to achieve the above-mentioned object, a liquid crystal display device of the present invention includes a liquid crystal panel provided with (1) a first substrate having first transparent electrodes provided in a form of matrix, (2) a second substrate, having second transparent electrodes, provided so as to face the first substrate, and (3) a liquid crystal layer sandwiched between the first substrate and the second substrate, a polarizing plate-equipped semitransmitting reflecting plate provided on a side opposite to a displaying surface of the liquid crystal panel, and illuminating means for illuminating the liquid crystal panel through the polarizing plate-equipped semitransmitting reflecting plate, wherein the liquid crystal panel includes active elements which control supplying of a charge to the first transparent electrodes by their switching, and reflectance and transmittance of the polarizing plate-equipped semitransmitting reflecting plate are set so as to make contrast of the liquid crystal panel higher when the illuminating means is not lighted than when the illuminating means is lighted.

With this arrangement, since the liquid crystal panel is provided with the active elements which control supplying of a charge to the first transparent electrodes, in the case of applying a voltage to the respective first transparent electrodes and the second transparent electrodes of the first substrate and the second substrate sandwitching the liquid crystal layer, discharge of the charge can be suppressed by switching of the active elements. This prevents the contrast from lowering when the illuminating means is lighted, thereby permitting to design a reflection-oriented liquid crystal display device.

In accordance with this arrangement, the reflectance and the transmittance of the polarizing plate-equipped semi-transparent reflecting plate are set so as to make contrast of the liquid crystal panel higher when the illuminating means is not lighted (referred to as transmitting mode hereinafter) than when the illuminating means is lighted (referred to as reflecting mode hereinafter).

With this arrangement, in the reflecting mode, a predetermined amount of surrounding light such as the sun light and indoor illumination is reflected by the polarizing plate-equipped semitransparent reflecting plate such that a display having relatively high contrast can be obtained. On the other hand, in the transmitting mode, compared with the reflecting mode, contrast lowers due to a decrease in the transmittance in the transmitting mode; however, since transmitting light from the illuminating means is constantly supplied to the liquid crystal display element, visibility does not become poor due to a change in the surrounding brightness.

Thus, with this arrangement, despite the fact that the liquid crystal display device is designed so as to be reflection-oriented, contrast can be increased both in the transmitting mode and the reflecting mode, thereby permitting to improve visibility in the both modes irrespective of the surrounding brightness.

For a fuller understanding of the nature and advantages of the invention, reference should be made to the ensuing detailed description taken in conjunction with the accompanying drawings.

BRIEF DESCRIPTION OF THE DRAWINGS

FIG. 2(a) is a perspective view showing a schematic arrangement of a liquid crystal panel provided with two-terminal non-linear resistance elements; and FIG. 2(b) is an enlarged drawing of the portion A of FIG. 2(a).

DESCRIPTION OF THE EMBODIMENTS

[First Embodiment]

The following will describe one embodiment of the present invention referring to FIG. 1 through FIG. 7.

Figure 1:
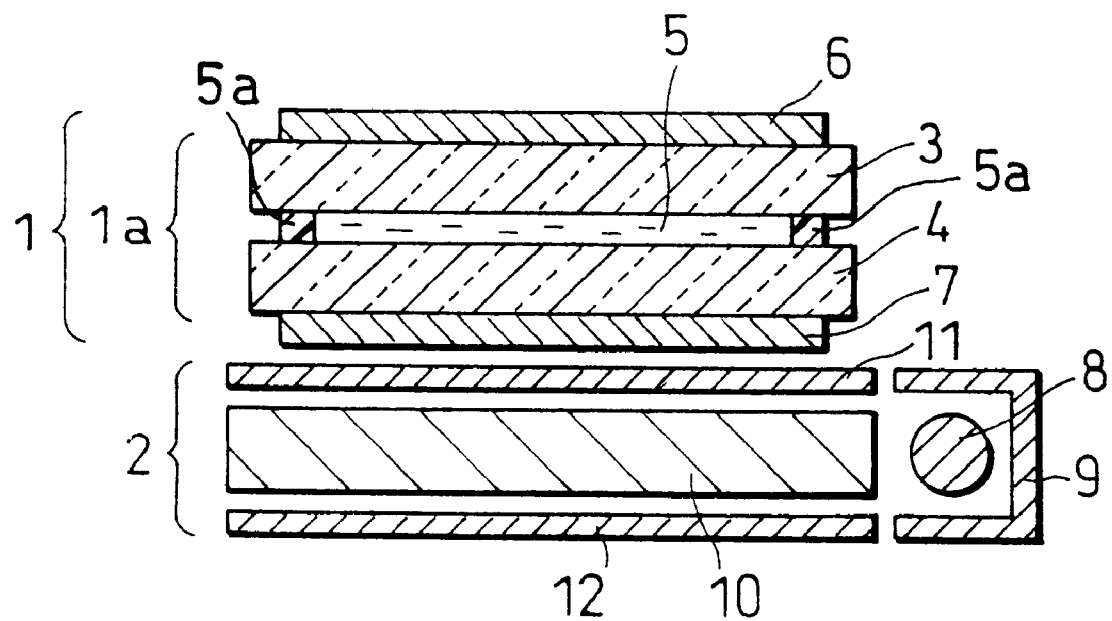
FIG. 1 is a cross sectional view showing an example of a structure of a liquid crystal display device of the present invention.

FIG. 1 shows a cross sectional view of a semitransmitting-type liquid crystal display device of the present embodiment. As shown in FIG. 1, the liquid crystal display device of this type is provided with a liquid crystal cell 1 and a white plate light source 2. The white plate light source 2 is provided on a back surface of the liquid crystal cell 1. Namely, the white plate light source 2 is provided on a surface opposite to a displaying surface of the liquid crystal cell 1. Note that, the screen size of the liquid crystal display device, for example, is 11 cm in diagonal line.

The liquid crystal cell 1 is provided with a liquid crystal panel 1a. the liquid crystal panel 1a is composed of a transparent upper side glass substrate 3 (first substrate), a lower side glass substrate 4 (second substrate), and a liquid crystal layer 5 which is sandwiched between the upper side glass substrate 3 and the lower side glass substrate 4 via a seal material 5a.

On the liquid crystal layer 5 side, as shown in FIG. 2(a) and FIG. 2(b) which is an enlarged drawing of the portion A of FIG. 2(a), the glass substrate 3 is provided with (1) a plurality of transparent electrodes 31 (first transparent electrodes) provided in a form of matrix, (2) signal electrodes 32 for supplying a charge to the plurality of transparent electrodes 31, (3) a plurality of two-terminal non-linear resistance element 33 (active elements) for switching continuity and discontinuity between the plurality of transparent electrodes 31 and the plurality of signal electrodes 32, and (4) a liquid crystal element 34. The two-terminal non-linear resistance elements 33 of the present embodiment are, for example, MIM elements having a metal-insulator-metal structure.

On the other hand, the lower glass substrate 4 is provided with scanning electrodes 41 (second transparent electrodes) composed of a plurality of transparent electrodes provided in stripes so as to face the transparent electrodes 31. Note that, it is possible to change the respective positions of the upper glass substrate 3 and the lower glass substrate 4.

Also, as shown in FIG. 1, on a surface of the liquid crystal panel 1a, namely, on a surface opposite to the liquid crystal layer 5 of the upper glass substrate 3, a polarizing plate 6 is provided. Likewise, on the other surface of the liquid crystal panel 1a, namely, on a surface opposite to the liquid crystal layer 5 of the lower glass substrate 4, a polarizing plate-equipped semitransmitting reflecting plate 7 is provided.

The white plate light source 2 is provided with a cool cathode fluorescent tube 8 (illuminating means), a chamber 9 for supporting the cool cathode fluorescent tube 8, a light guiding plate 10, a scattering sheet 11, and a reflecting sheet 12. The cool cathode fluorescent tube 8 is provided so that it can emit light on one end surface of the light guiding plate 10. The light guiding plate 10 is provided so as to face the liquid crystal cell 1 with respect to the entire back surface (surface opposite to the displaying surface of the liquid crystal cell 1). The scattering sheet 11 is provided between the light guiding plate 10 and the polarizing plate-equipped semitransmitting reflecting plate 7. The reflecting plate 12 is provided on the side opposite to the scattering sheet 11 with respect to the light guiding plate 10.

In the case of using the liquid crystal display device having the described arrangement in a dark environment, displaying is carried out by lightning of the cool cathode fluorescent tube 8. In this case, the illuminating light from the cool cathode fluorescent tube 8 incidents on the light guiding plate 10 of the white plate light source 2 from one end surface of the light guiding plate 10 so as to be guided into the light guiding plate 10. The illuminating light thus guided into the light guiding plate 10 is uniformly scattered by the scattering sheet 11 and the reflecting sheet 12 so as to be emitted towards the liquid crystal cell 1. Then, the illuminating light transmits through the polarizing plate-equipped semitransmitting reflecting plate 7 of the liquid crystal cell 1 so as to be emitted towards the front surface side of the liquid crystal display device. In short, displaying is carried out by using the transmitting light from the white plate light source 2. Note that, displaying by lighting of the cool cathode fluorescent tube 8 in this manner will be referred to as a transmitting mode hereinafter.

On the other hand, in the case of using the liquid crystal display device in a luminous environment, displaying is carried out without lighting of the cool cathode fluorescent tube 8. In this case, surrounding light such as indoor illumination transmits through the polarizing plate 6, the upper side glass substrate 3, liquid crystal layer 5, the lower side glass substrate 4 in this order so as to reach the polarizing plate-equipped semitransmitting reflecting plate 7. The surrounding light thus reached to the polarizing plate-equipped semitransmitting reflecting plate 7 is then reflected by the polarizing plate-equipped semitransmitting reflecting plate 7 so as to be emitted towards the displaying surface side of the liquid crystal display device through the liquid crystal cell 1 in the reversed order, thereby displaying an image on the displaying surface of the liquid crystal display device. Note that, displaying without lighting of the cool cathode fluorescent tube 8 will be referred to as a reflecting mode hereinafter.

The following will explain the method by which the respective contrast in the transmitting mode and the reflecting mode are measured in the liquid crystal display device.

Figure 3:
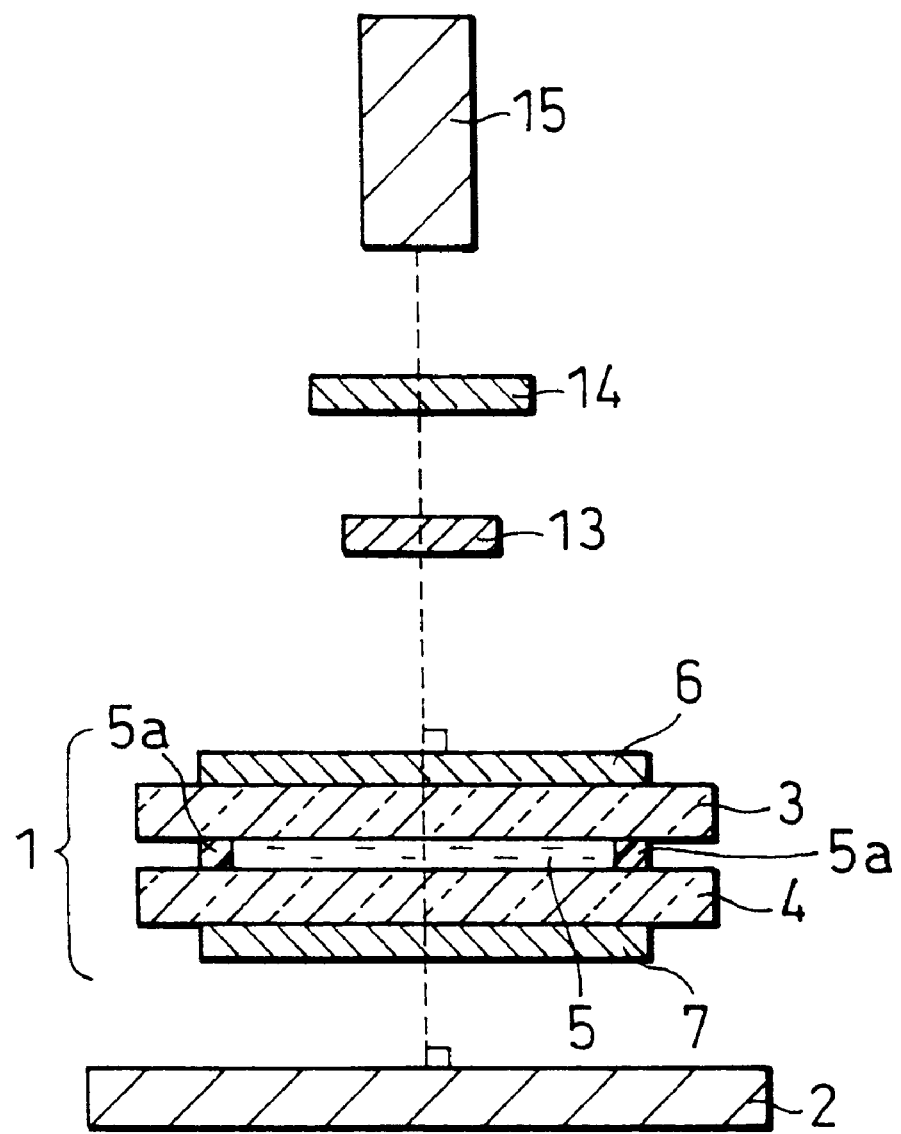
FIG. 3 is a cross sectional view showing a schematic arrangement when measuring contrast in a transmitting mode of the liquid crystal display device.

FIG. 3 is a cross sectional view showing a structure when measuring contrast in the transmitting mode of the liquid crystal display device. Above the displaying surface side of the liquid crystal cell 1, there are provided in this order a lens 13, a visibility correcting filter 14 for correcting visibility of light which has transmitted through the lens 13, and a light receiving element 15 for receiving light which has transmitted through the lens 13 and the visibility correcting filter 14.

With this arrangement, the light from the white plate light source 2 transmits through the liquid crystal cell 1, the lens 13, and the visibility correcting filter 14 in this order so as to be received by the light receiving element 15. According to the amount of light received by the light receiving element 15, the respective luminance values when displaying white and when displaying black are determined so as to measure the ratio of the two luminance values, namely, the contrast is measured.

Figure 4:
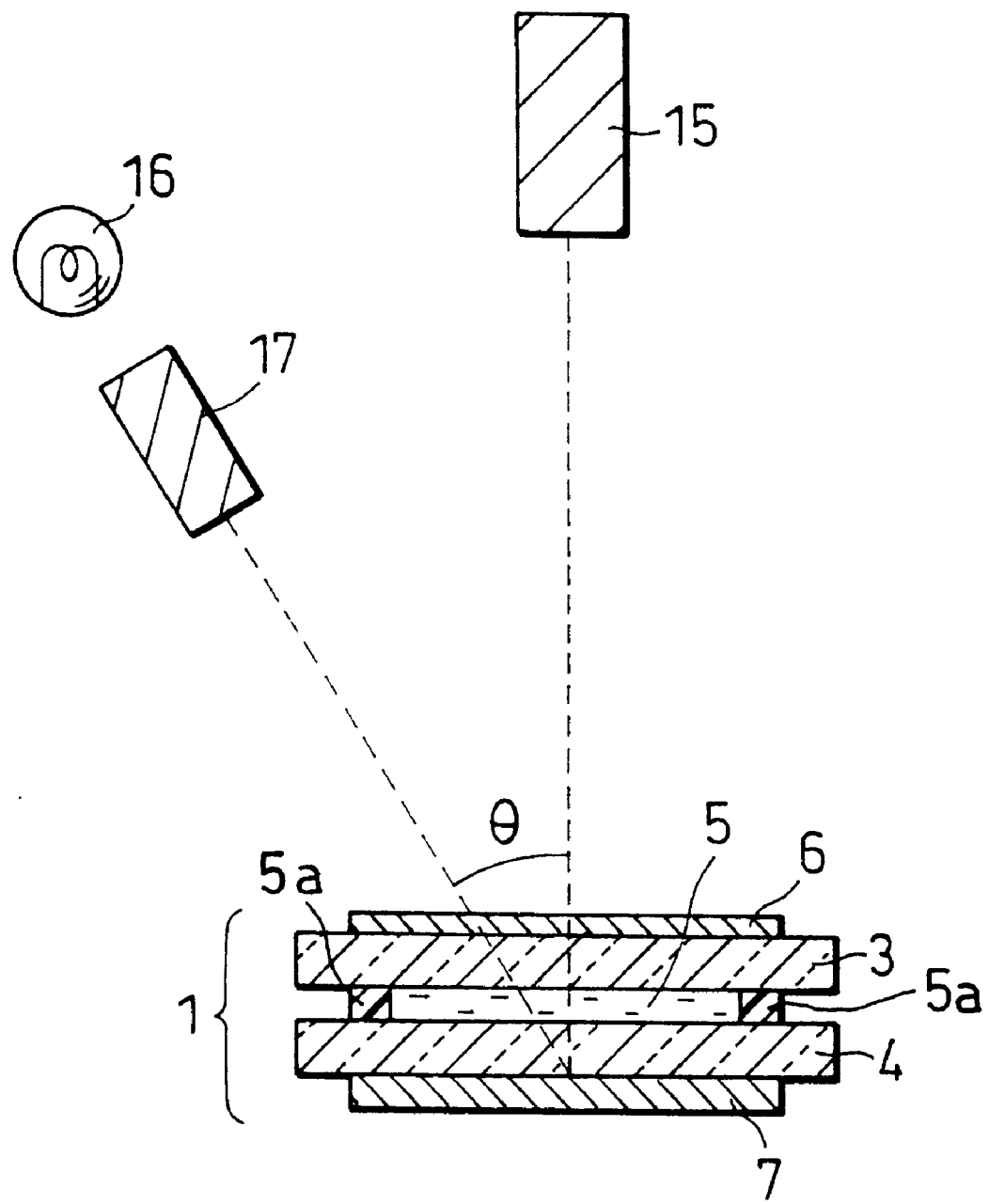
FIG. 4 is a cross sectional view showing a schematic arrangement when measuring contrast in a reflecting mode of the liquid crystal display device.

In contrast, FIG. 4 is a cross sectional view showing a structure when measuring contrast in the reflecting mode of the liquid crystal display device. In a direction of the normal with respect to the displaying surface of the liquid crystal cell 1, the light receiving element 15 provided with a visibility correcting filter is provided, and in a direction inclined by the angle θ with respect to the normal to the polarizing plate-equipped semitransmitting reflecting plate 7, a light source 16 and a projector 17 are provided. Note that, in the present embodiment, the angle θ is set to 30°, and the diameter of a measuring point on the surface of the polarizing plate 6 is 0.2 mm.

With this arrangement, the light emitted by the light source 16 incidents on the liquid crystal cell 1 through the projector 17. The incident light then reaches the polarizing plate-equipped semitransmitting reflecting plate 7 through the polarizing plate 6, the upper side glass substrate 3, the liquid crystal layer 5, and the lower side glass substrate 4 of the liquid crystal cell 1 in this order so as to be reflected by the polarizing plate-equipped semitransmitting reflecting plate 7. The reflected light off the polarizing plate-equipped semitransmitting reflecting plate 7 is emitted towards the displaying surface side of the liquid crystal display device through the liquid crystal cell 1 in the reversed order so as to be received by the light receiving element 15. Then, according to the amount of light received by the light receiving element 15, the contrast is measured.

Table 1 shows the results of contrast measurement measured in the described manner in the transmitting mode and the reflecting mode.

Note that, for comparison, the contrast of a conventional semitransmitting-type liquid crystal display device adopting the STN (Super Twisted Nematic) system respectively in the transmitting mode and the reflecting mode are also measured by the same method. Here, in order to carry out the measurement under the same condition, the white plate light source 2 of the present embodiment is adopted as illuminating means of the conventional liquid crystal display device. Table 1 shows the results of the measurement.

TABLE 1

|  | Contrast Reflecting Mode | Contrast Transmitting mode |
| --- | --- | --- |
| Conventional Device | 8 | 10 |
| First Embodiment | 37 | 14 |
| Second Embodiment | 37 | 14 |

As shown in Table 1, although the contrast of the conventional semitransmitting-type liquid crystal display device adopting the STN system is slightly higher in the transmitting mode than that in the reflecting mode, they are substantially the same. This is due to the fact that considering the visibility in the transmitting mode and the reflecting mode, the conventional semitransmitting-type liquid crystal display device adopting the STN system is designed so that the contrast in the transmitting mode and the contrast in the reflecting mode are the same.

In the conventional semitransmitting-type liquid crystal display device, as shown in Table 1, the contrast in the reflecting mode is 8 which indicates poor visibility. However, if a reflection-oriented semitransmitting reflecting plate is adopted, the contrast in the reflecting mode can be increased to 12 (not shown), thereby obtaining relatively high visibility. However, in this case, the contrast in the transmitting mode drops to 3 (not shown), resulting in poor visibility. Thus, in the conventional semitransmitting-type liquid crystal display device, the visibility cannot be improved in both modes.

In contrast, the contrast of the semitransmitting-type liquid crystal display device of the present embodiment in both the transmitting mode and the reflecting mode are greatly higher than that of the conventional semitransmitting-type liquid crystal display device adopting the STN system. This is due to the fact that since the semitransmitting-type liquid crystal display device of the present embodiment is provided with the active elements such as the MIM elements, in the case of applying a voltage to two types of electrodes (transparent electrodes 31 and scanning electrodes 41) sandwitching the liquid crystal layer 5 (liquid crystal element 34), discharge of the charge can be suppressed by the switching of the active elements. Thus, in the semitransmitting-type liquid crystal display device of the present embodiment, compared with the conventional semitransmitting-type liquid crystal display device adopting the STN system, higher contrast can be realized.

In addition, as a reference, the respective contrast of (1) a reflecting-type liquid crystal display device adopting the STN system and (2) a reflecting-type liquid crystal display device adopting the active elements are also measured by the method of FIG. 4. Note that, in this case, the polarizing plate-equipped semitransmitting reflecting plate 7 of FIG. 4 is replaced with a polarizing plate-equipped reflecting plate. The result shows that the contrast of the (1) a reflecting-type liquid crystal display device adopting the STN system and (2) a reflecting-type liquid crystal display device adopting the active elements are 13 and 40, respectively. Thus, also in the reflective-type liquid crystal display device, higher contrast can be obtained in the case of adopting the active elements than in the case of adopting the STN system even in the reflective-type liquid crystal display device.

As described, since the semitransmitting-type liquid crystal display device of the present embodiment adopting the active elements has higher contrast than the conventional liquid crystal display device adopting the STN system, even in the case of designing the semitransmitting-type liquid crystal display device so as to make the device reflection-oriented by setting of the reflectance and the transmittance of the material of the polarizing plate-equipped semitransmitting reflecting plate 7, the visibility can be improved both in the transmitting mode and the reflecting mode.

In the present embodiment, the reflectance and the transmittance of the material of the polarizing plate-equipped semitransmitting reflecting plate 7 are set so that the contrast of the liquid crystal panel 1a is (1) not less than 10 when the cool cathode fluorescent tube 8 is not lighted and (2) not less than 3 when the cool cathode fluorescent tube 8 is lighted. Note that, it is preferable to set the reflectance and the transmittance of the material of the polarizing plate-equipped semitransmitting reflecting plate 7 so that the contrast of the liquid crystal panel 1a is (a) not less than 20 when the cool cathode fluorescent tube 8 is not lighted and (b) not less than 10 when the cool cathode fluorescent tube 8 is lighted. The basis of the setting values of the contrast of the liquid crystal panel 1a will be mentioned later.

Note that, the ratio of contrast in the reflecting mode and the transmitting mode substantially corresponds to the ratio of the reflectance and the transmittance of the material of the polarizing plate-equipped semitransmitting reflecting plate 7. Hence, the reflectance and the transmittance of the material of the polarizing plate-equipped semitransmitting reflecting plate 7 can be set so as to make the respective contrast in the reflecting mode and the transmittance mode to have desired values.

As described, because the reflectance and the transmittance of the material of the polarizing plate-equipped semitransmitting reflecting plate 7 are set, in the transmitting mode wherein the cool cathode fluorescent tube 8 is lighted, the transmittance of the transmitting light supplied from the white plate light source 2 is slightly lower than that of the conventional liquid crystal display device which is designed so as to make the respective contrast in the transmitting mode and the reflecting mode substantially the same. Nevertheless, since the transmitting light is constantly supplied to the liquid crystal cell 1, the poor visibility does not result due to a change in surrounding brightness.

On the other hand, in the reflecting mode wherein the cool cathode fluorescent tube 8 is not lighted, surrounding light such as the sun light and the indoor illumination is reflected by the polarizing plate-equipped semitransmitting reflecting plate 7 which has been set to have higher reflectance than that of the conventional liquid crystal display device. As a result, it is possible to obtain bright displaying having relatively higher contrast than that of the conventional liquid crystal display device.

Thus, by designing the semitransmitting-type liquid crystal display device so as to make the device reflection-oriented, it is ensured to suppress the deterioration of visibility in the both modes. As a result, the displaying characteristics can be greatly improved irrespective of the surrounding brightness.

The following will explain the basis on which the contrast of the liquid crystal panel 1a is set to have the aforementioned lower limits respectively when the cool cathode fluorescent tube 8 is lighted and not lighted.

Not limiting to the semitransmitting-type liquid crystal display device, in a common liquid crystal display device, factors influencing the easiness to recognize the display (visibility) include a visual angle, brightness, and contrast.

The visual angle refers to an angle made by two straight lines connecting (a) each of two most widely separated points on an image under observation to (b) an eye of the observer. Hence, the visual angle is determined by (1) the size of characters and (2) the distance between the eye of the observer and the displaying surface.

The size of characters changes depending on (1) how the liquid crystal display device is used, (2) the number of displaying pixels, and (3) the display size, etc. Supposing that the distance between the eye of the observer and the displaying surface is substantially 30 cm, considering the visibility, it is preferable that the size of characters is not less than 5 mm. Note that, needless to say, given the same display size, more characters can be displayed when smaller characters are used.

The following will explain the brightness. In the case where the liquid crystal display device is of the reflecting type or in the reflecting mode, the brightness refers to the brightness of surrounding light. The following are examples of the illuminance of various surrounding light: the moon light (0.2 lux), sidewalk illumination (5 to 20 lux), indoor illumination (20 to 100 lux in a relatively dark place such as a storage room, or 200 to 1000 lux on an office desk). Indoor illumination is generally designed to have illuminance of 300 to 500 lux. The sun light has illuminance of 1000 to 10000 lux in a place such as by a window and shade at the outside, and 50000 to 100000 lux in a place where there is direct sun light.

On the other hand, in the case where the liquid crystal display device is of transmitting type or in the transmitting mode, the brightness refers to the brightness of the illuminating means (cool cathode fluorescent tube 8 in the present embodiment) provided in the liquid crystal display device. In this case, it is set such that the luminance of the displaying surface of the liquid crystal panel 1a is 100 to 500 cd/m$^2$.

The contrast refers to, as mentioned above, the ratio of respective luminance values when displaying white and when displaying black, while driving the liquid crystal cell 1, and the visibility improves as the contrast increases. The contrast differs depending on the number of scanning lines and a frame frequency. In general, in the liquid crystal display device adopting the STN system or other systems having 400 scanning lines using no active elements, contrast in a range of 3 to 30 is obtained. In contrast, in the liquid crystal display device adopting the two-terminal non-linear resistance elements such as the MIM elements, contrast in a range of 20 to 100 is obtained. Also, in the liquid crystal display device adopting three-terminal non-linear resistance elements such as TFTs (Thin Film Transistors), contrast of 50 to 100, or more is obtained.

Figure 5:
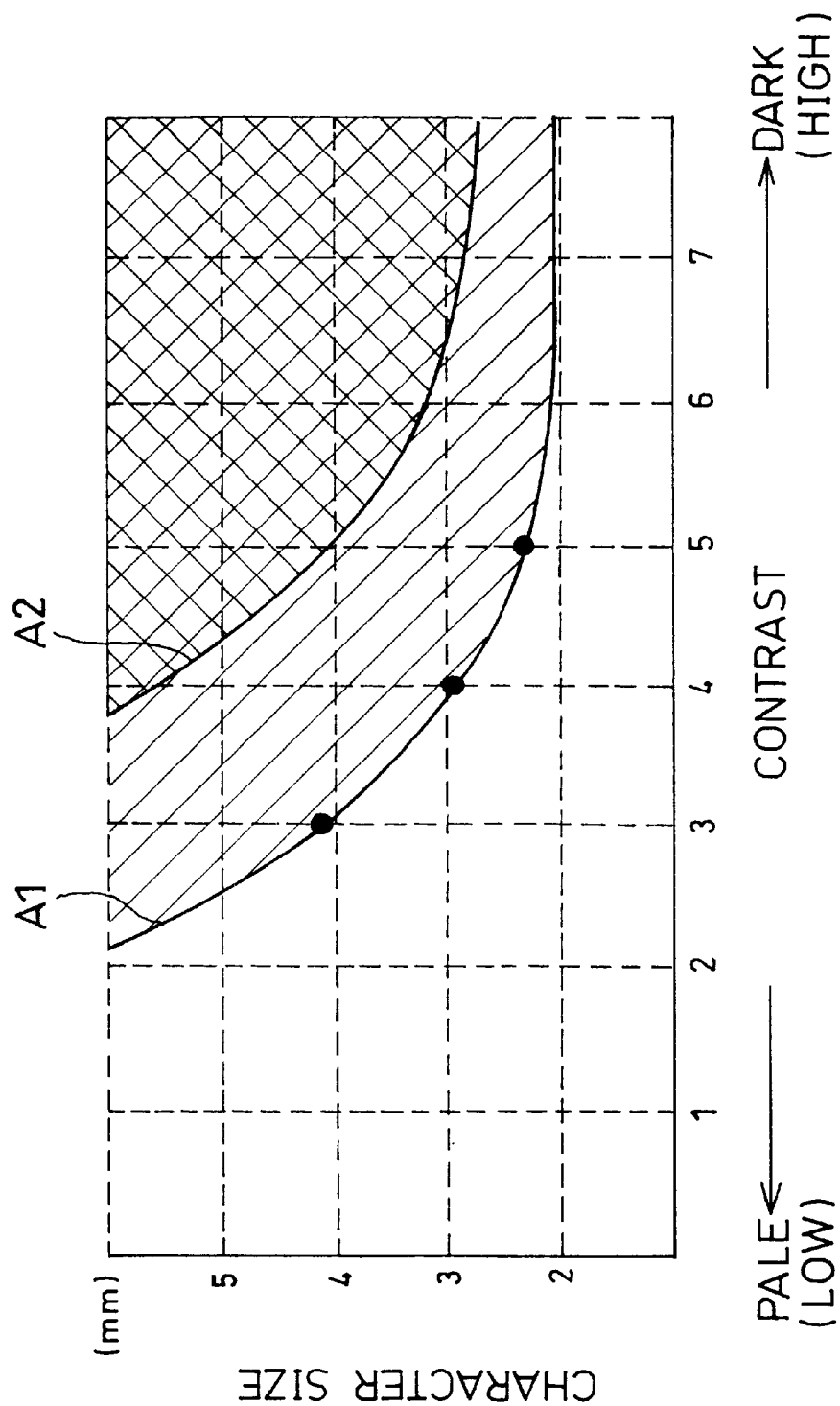
FIG. 5 is a graph of a relationship between contrast and a character size, indicating easiness to read characters.

FIG. 5 shows a relationship between a character size and contrast indicating easiness to read characters. Note that, in FIG. 5, the region to the right of the solid line A1 indicates the easiness to read characters below a predetermined contrast as perceived by observers younger than 30 years old, and the region to the right of the solid line A2 indicates the easiness to read characters below a predetermined contrast as perceived by observers younger than 45 years old. As it can be seen from the FIG. 5, in the case where the character size is set to 5 mm, in order for an observer to recognize the character without difficulties, the contrast of 3 is sufficient for an observer of younger than 30 years old, whereas the contrast of 4 is required for an observer of 45 years old or older.

Figure 6:
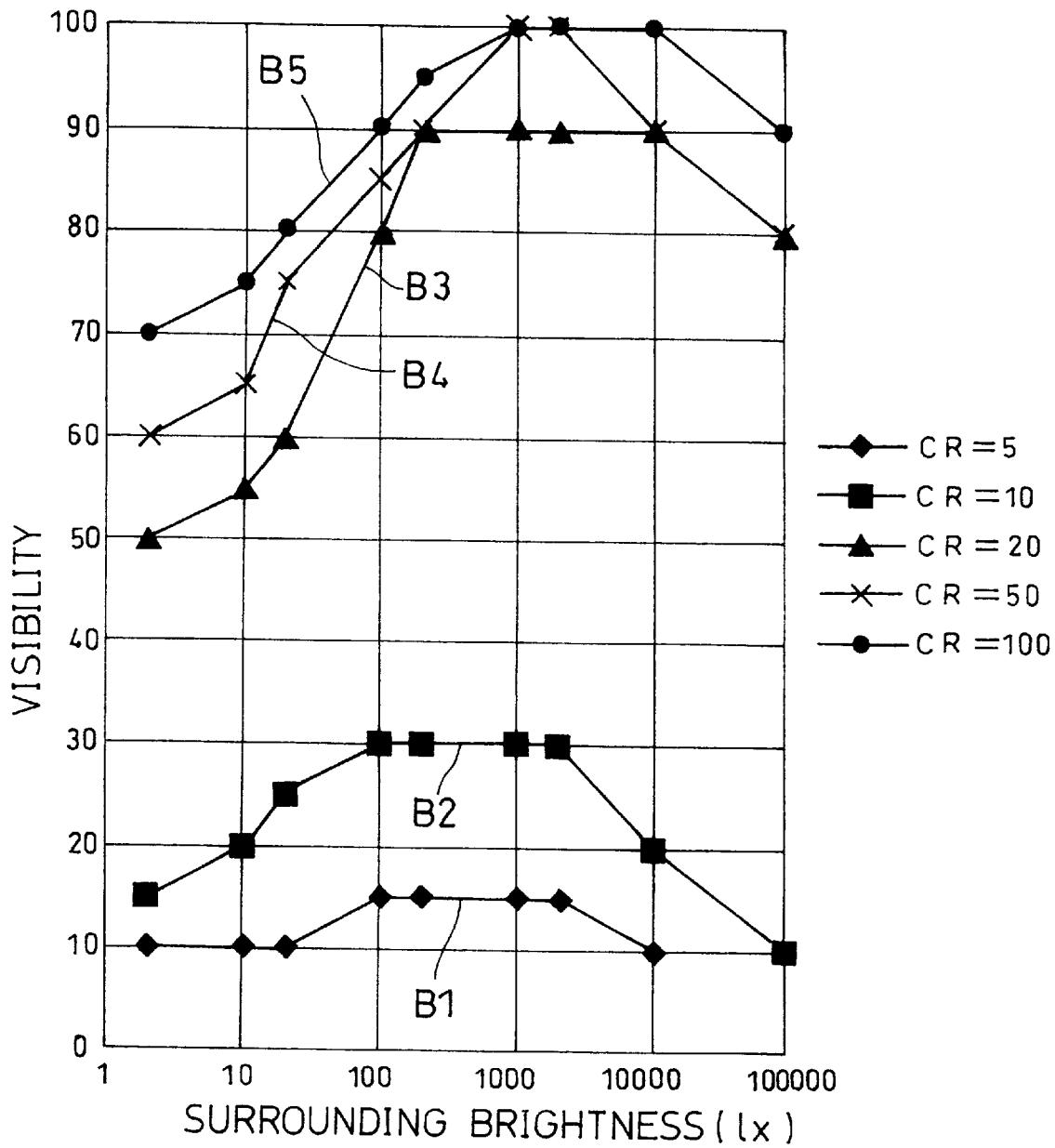
FIG. 6 is a graph showing a relationship between surrounding brightness and visibility with respect to each contrast in the reflecting mode.

FIG. 6 shows a relationship between surrounding brightness and the visibility in the liquid crystal display device of the reflecting type or in the reflecting mode. In FIG. 6, the solid line B1 connecting the points (♦) shows the relationship when the contrast is 5 (contrast is abbreviated to CR in FIG. 6). Similarly, the solid line B2 connecting the points (■), the solid line B3 connecting the points (▲), the solid line B4 connecting the points (X), and the solid line B5 connecting the points (●) respectively show the relationship when the contrast is 10, 20, 50, and 100.

Note that, the visibility refers to how easy it is to read characters. However, since there is an individual difference in perceiving how easy it is to read the characters, it is relatively difficult to encipher the visibility solely on the basis of the individual judgement. Thus, in the present embodiment, easiness to read, as perceived by 5 males in ages between 20 to 40 years old, is indicated in 100 levels with respect to each size of characters of 5 mm, 10 mm, and 20 mm which are commonly adopted in display devices. Then, the average of values thus obtained is taken so as to make the resulting average value the visibility value. This increases the validity of (1) the enciphered visibility, and (2) the reference values for judging the quality of the visibility (mentioned later). The following shows a relationship between the visibility values and the perceptions in reading characters.

Visibility above 90 (incl. 90) . . . Very Easy to Read

Visibility between 70 and 90 (excl. 90). . . Easy to Read

Visibility between 50 and 70 (excl. 70) . . . Able to Read without Effort visibility between 20 and 50 (excl. 50) . . . Able to Read, but Requires Effort Visibility between 10 and 20 (excl. 20) . . . Barely Able to Read Visibility below 10 (excl. 10) . . . Unable to Read From this, it can be seen that in order to read characters, the visibility of not less than 20 is required. Also, in order to read characters without an effort, the visibility of not less than 50 is required. Thus, hereinafter, the quality of visibility will be judged using the visibility of 20 or 50 as reference.

As can be seen from FIG. 6, in the reflecting mode, visibility increases as the surrounding light becomes brighter. However, above a certain brightness, the visibility decreases. This is due to the fact that the observer sees glare in response to increased amount of reflected light caused by the surrounding light which is too bright.

Also, once the surrounding brightness falls below 10 lux, desired visibility cannot be obtained no matter how much the contrast is increased. In this case, it is required to light the illuminating means of the liquid crystal display device so that the liquid crystal display device is in the transmitting mode.

Hence, considering the fact that the reflecting mode is employed often in the condition where the surrounding brightness is in a range of 10 and several hundred lux, and the surrounding brightness is at least 10 lux, contrast of not less than 10 is required in order to obtain visibility of not less than 20, and in order to obtain desirable visibility of not less than 50, contrast of not less than 20 is required.

Figure 7:
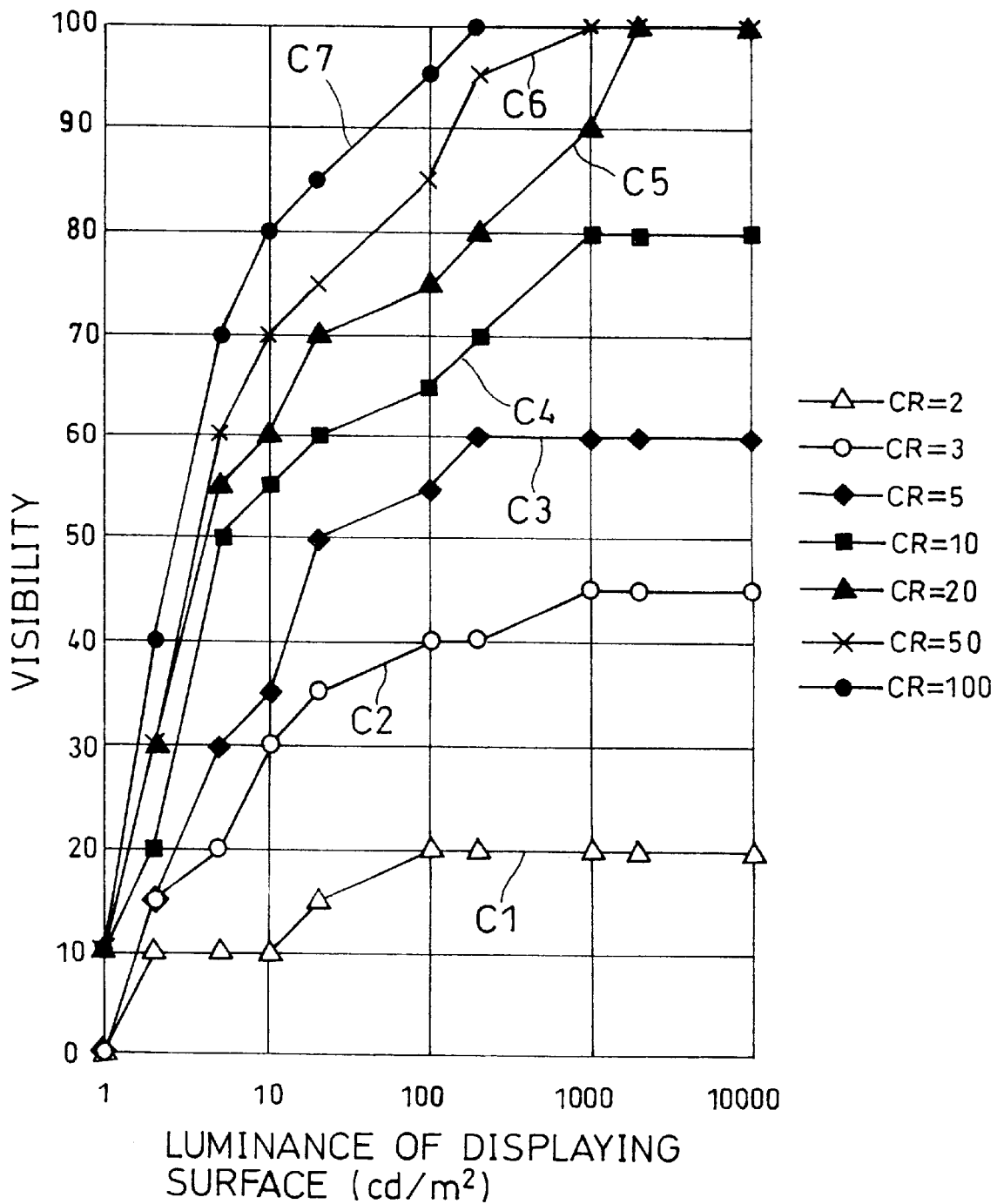
FIG. 7 is a graph showing a relationship between luminance of a displaying surface of the liquid crystal panel and visibility with respect to each contrast in the transmitting mode.

FIG. 7 shows a relationship between luminance of the displaying surface and the visibility in the liquid crystal display device of the transmitting type or in the transmitting mode in a dark environment. In FIG. 7, the solid line C1 connecting the points (∆) shows the relationship when the contrast is 2. Similarly, the solid line C2 connecting the points (○), the solid line C3 connecting the points (♦), the solid line C4 connecting the points (■), the solid line C5 connecting the points (▲), the solid line C6 connecting the points (X), and the solid line C7 connecting the points (●) respectively show the relationship when the contrast is 3, 5, 10, 20, 50, and 100.

When the luminance of the displaying surface is less than 5 cd/m$^2$, the visibility is poor despite the fact that the contrast is high with respect to the entire surface. Thus, considering the fact that the luminance of the displaying surface is at least 5 cd/m$^2$$_1$, in order to obtain visibility of not less than 20, contrast of not less than 3 is required, and in order to obtain desirable visibility of not less than 50, contrast of not less than 10 is required.

Thus, by setting the contrast of the liquid crystal panel 1a to have (1) a value of not less than 10 when the illuminating means is not lighted, and (2) a value of not less than 3 when the illuminating means is lighted, it is possible to ensure a minimum visibility required for recognizing the image.

Also, when the contrast of the liquid crystal panel 1a is set to have (1) a value of not less than 20 when the illuminating means is not lighted, and (2) a value of not less than 10 when the illuminating means is lighted, it is possible to ensure further desirable visibility both in the transmitting mode and the reflecting mode.

[Second Embodiment]

Figure 8:
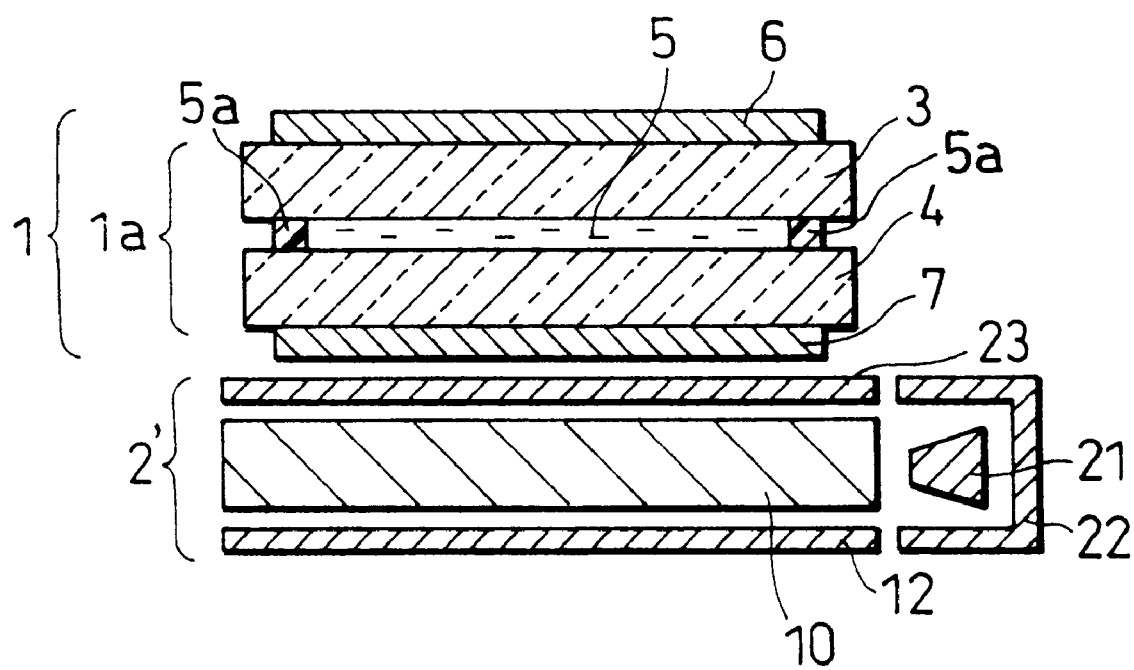
FIG. 8 is a cross sectional view showing another example of a structure of a liquid crystal display device of the present invention.
Figure 9:
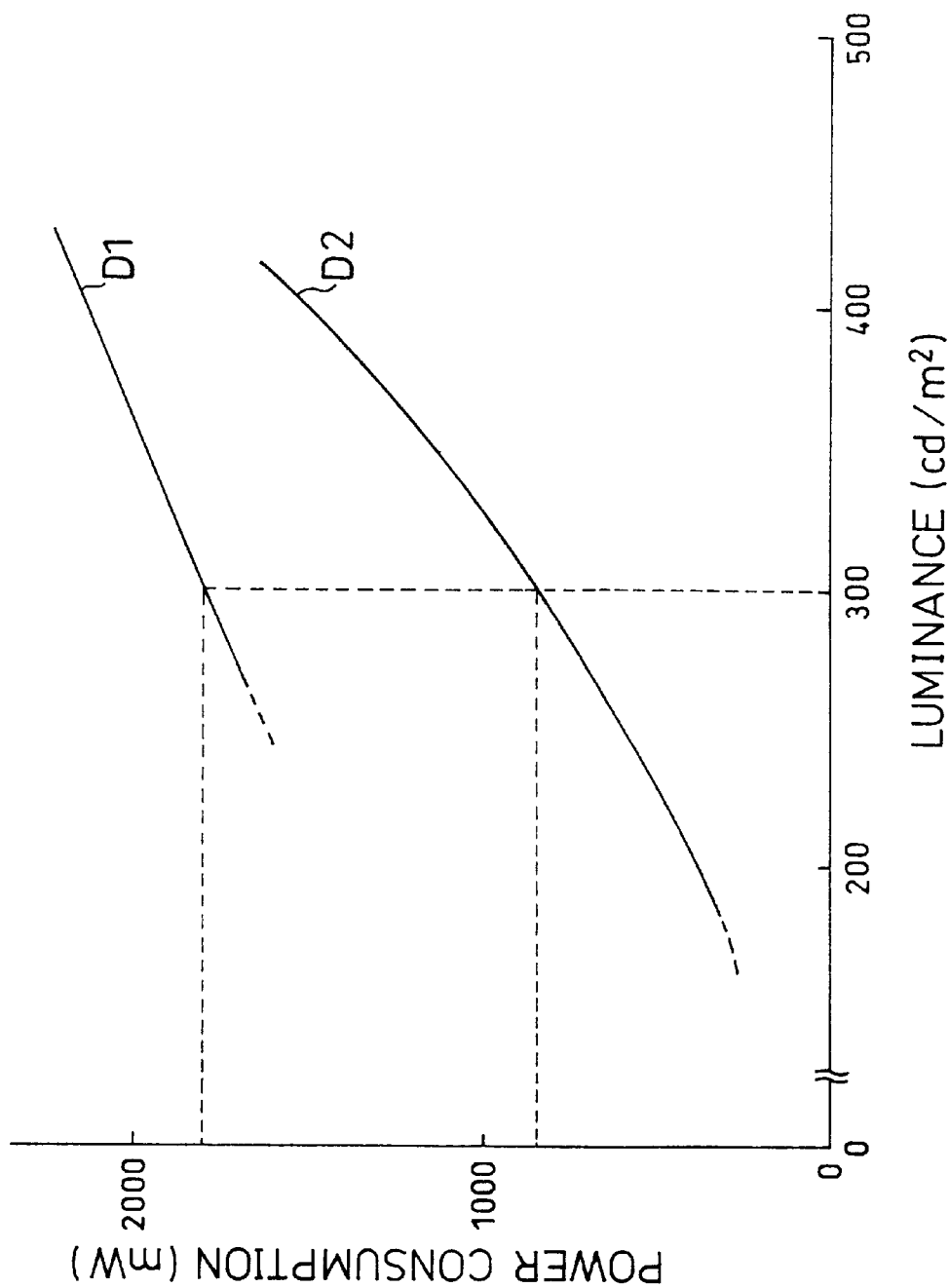
FIG. 9 is a graph showing a relationship between luminance of a white plate light source provided in the liquid crystal display device and power consumption.
Figure 10:
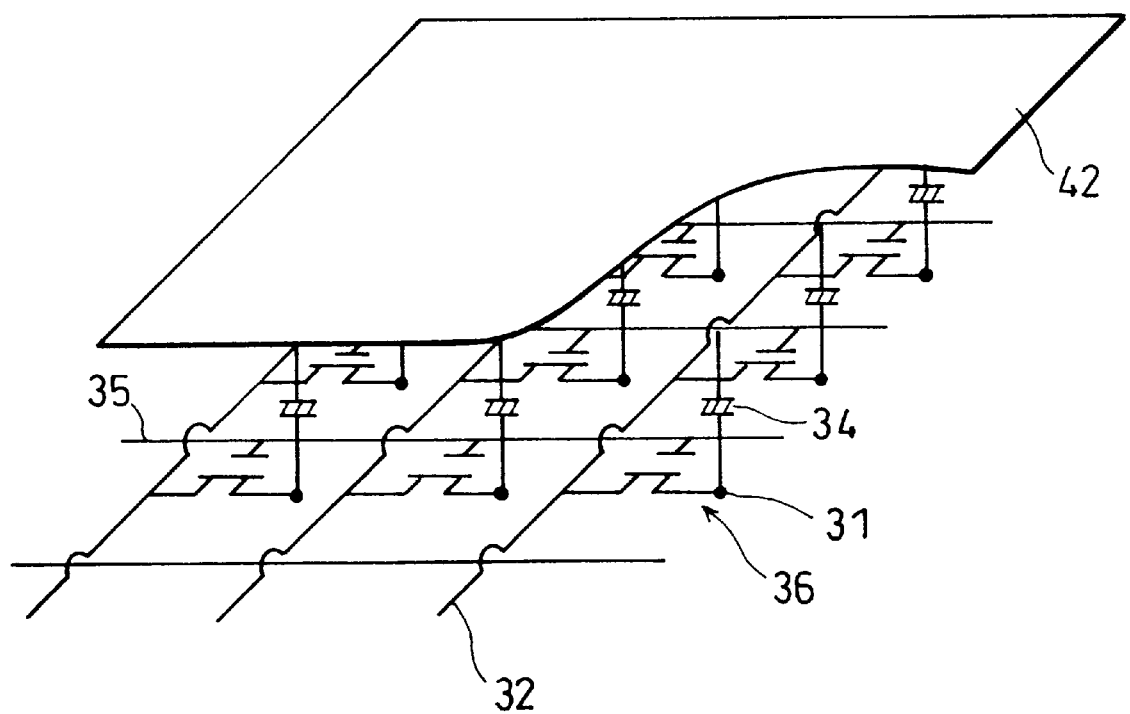
FIG. 10 is a perspective view showing a schematic arrangement of a liquid crystal panel provided with three-terminal non-linear resistance elements.

The following will describe another embodiment of the present invention referring to FIG. 8 through FIG. 10. Note that, the members having the same functions as those described in the first embodiment are given the same reference numerals, and explanations thereof are omitted here. Also, in the present embodiment, instead of the white plate light source 2 (see FIG. 1) adopted in the first embodiment, a white plate light source 2' is adopted. Thus, explanations of parts of a structure of the liquid crystal display device of the present embodiment which are same as that of the first embodiment are omitted here. Instead, explanations will focus on the structure of the white plate light source 2' and the entire operation of the liquid crystal display device.

FIG. 8 is a cross sectional view showing a semitransmitting-type liquid crystal display device of the present embodiment. The white plate light source 2' is provided with an LED (Light-Emitting Diode) 21 (illuminating means), a chamber 22 for supporting the LED 21, a light guiding plate 10, a fluorescence scattering layer 23 (wavelength converting means) provided between the guiding plate 10 and the polarizing plate-equipped semi-transmitting reflecting plate 7, and a reflecting sheet 12 provided on the opposite side of the fluorescent scattering layer 23 with respect to the guiding plate 10.

The LED 21 is a light-emitting diode which emits, for example, blue light, and the LED 21 is provided so that it can emit light on one end surface of the light guiding plate 10. The fluorescence scattering layer 23 is made of a mixture of (1) a fluorescent substance, upon activation by light emitted by the LED 21, for emitting fluorescence and (2) a white substance for scattering the fluorescence. In short, the wavelength of the light emitted by the LED 21 is converted into white light by the fluorescent substance and the white substance.

In the case of using the semitransmitting-type liquid crystal display device having the described arrangement in a luminous environment, displaying is carried out without lighting of the LED 21. Namely, in this case, surrounding light such as indoor illumination transmits through the polarizing plate 6, the upper side glass substrate 3, the liquid crystal layer 5, and the lower side glass substrate 4 in this order so as to reach the polarizing plate-equipped semitransmitting reflecting plate 7. The surrounding light is then reflected by the polarizing plate-equipped semitransmitting reflecting plate 7 so as to be emitted towards the displaying surface side of the liquid crystal display device through the liquid crystal cell 1 in the reversed order, thereby displaying an image on the displaying surface of the liquid crystal display device.

On the other hand, in the case of using the semitransmitting-type liquid crystal display device having the described arrangement in a dark environment, displaying is carried out by lighting of the LED 21. In this case, the light emitted by the LED 21 incidents on the light guiding plate 10 of the white plate light source 2' from one end surface of the light guiding plate 10 so as to be guided into the light guiding plate 10. The light thus guided into the light guiding plate 10 is uniformly scattered by the fluorescence scattering layer 23 and the reflecting sheet 12 so as to be emitted towards the liquid crystal cell 1.

Here, the fluorescent substance contained in the fluorescence scattering layer 23 is activated by the incident light on the fluorescence scattering layer 23. As a result, the wavelength of the incident light is converted into white light. The white light from the fluorescence scattering layer 23 is then emitted towards the liquid crystal cell 1. Then, the white light transmits through the polarizing plate-equipped semi-transmitting reflecting plate 7 of the liquid crystal cell 1 so as to be emitted towards the front surface side of the liquid crystal display device, thereby displaying an image on the displaying surface of the liquid crystal display device.

The respective contrast of the liquid crystal display device of the present embodiment in the transmitting mode and the reflecting mode are also measured by the method described in the first embodiment. Table 1 shows the results of the measurement. As can be seen from Table 1, as in the first embodiment, the displaying characteristic of the semitransmitting-type liquid crystal display device is much greater than that of the conventional liquid crystal display device.

FIG. 9 shows (1) a relationship between the luminance of the white plate light source 2 (when used alone) adopted in the first embodiment and the power consumption, and (2) a relationship between the luminance of the white plate light source 2' (when used alone) adopted in the second embodiment. Note that, the solid lines D1 and D2 respectively indicate the case of adopting the white plate light source 2 and the white plate light source 2'.

In FIG. 9, when the luminance of the illuminating means (when used alone) is not more than 500 cd/m$^2$, power consumption is lower in the case of adopting the LED 21 than the case of adopting the cool cathode fluorescent tube 8. In particular, when the luminance is 300 cd/m$^2$, the power consumption is substantially 1800 mW in the first embodiment, whereas the power consumption is substantially 850 mW in the second embodiment which is less than 50 per cent of the power consumption in the first embodiment. This phenomenon can be explained by the following.

Contrary to the LED 21 which emits light under direct current, the cool cathode fluorescent tube 8 (see FIG. 1) emits light under alternating current with high pressure and high frequency, which is converted from the direct current by an inverter. This conversion by the inverter induces current loss. This increases the power consumption when adopting the cool cathode fluorescent tube 8.

Also in the present embodiment, because the high pressure and high frequency are not generated, the possibility of (1) a noise adversely affecting peripheral components and (2) fuming and firing can be lowered. Further, since it is not required to provide the inverter, it is possible to make it small the outside dimension of the entire system provided with the liquid crystal display device. Thus, since the semitransmitting-type liquid crystal display device is provided with the LED 21 as the illuminating means, it is possible to realize a high quality, low power consuming, and space saving semitransmitting-type liquid crystal display device.

Incidentally, because the transmitting-type liquid crystal display device requires luminance of the illuminating means of 1000 to several thousand cd/m$^2$, the cool cathode fluorescent tube is commonly adopted despite its high power consumption.

Also, since the transmittance of the light transmitting through the liquid crystal cell 1 is in a range of several percent to 20 percent, supposing that the transmittance is, for example, 10 percent, in order to obtain luminance, on the displaying surface, of not less than 5 cd/m$^2$ which the minimum luminance required to obtain desirable visibility as described in the first embodiment, a calculation shows that it is required to have luminance of the illuminating means of not less than 50 cd/m$^2$. Similarly, in order to obtain luminance of not less than 500 cd/m$^2$ on the displaying surface, a calculation shows that it is required to have luminance of the illuminating means of not less than 5000 cd/m$^2$. Note that, in the case of not adopting a color filter, the transmittance increases to 20 percent to 40 percent.

Also, although not shown, when the luminance of the illuminating means is above 500 cd/m$^2$, the amount of power consumed by the LED 21 becomes greater than the amount of power consumed by the cool cathode fluorescent tube 8. This is contrary to the case when the luminance of the illuminating means is not more than 500 cd/m$^2$ in which the amount of power consumed by the LED 21 is less than the amount of power consumed by the cool cathode fluorescent tube 8. Thus, in order to obtain luminance of the illuminating means of not less than 500 cd/m$^2$, theocratically, it is desirable to adopt the cool cathode fluorescent tube 8 as the illuminating means.

However, in the semitransmitting-type liquid crystal display device, surrounding light is used as reflecting illumination in a luminous environment, and therefore it is required to light the illuminating means only in a dark environment. Further, even when the illuminating means is lighted in the transmitting mode, a small amount of the surrounding light can be used as the reflecting illumination. Thus, it is not required to have luminance of the illuminating means as high as that in the transmitting-type liquid crystal display device. That is to say, in the semitransmitting-type liquid crystal display device, it is sufficient to have luminance of the illuminating means of 50 cd/m$^2$ to several hundred cd/m$^2$. Therefore, when considering the power consumption of the semitransmitting liquid crystal display device, luminance of the illuminating means of not more than 500 cd/m$^2$ is relevant. Thus, by adopting the LED 21 as the illuminating means, compared with the case of adopting the cool cathode fluorescent tube 8, the power consumption can be greatly reduced not only in the reflecting mode but also in the transmitting mode.

In the semitransmitting-type liquid crystal display device, since the maximum transmittance of the liquid crystal cell 1 is 40 percent, luminance of the illuminating means of 500 cd/m$^2$ corresponds to luminance of, at the maximum, 200 cd/m$^2$ on the displaying surface of the liquid crystal display panel 1a. Also, as the result of the first embodiment shows, the minimum luminance of the displaying surface of the liquid crystal panel 1a required for the observer to read characters without an effort is not less than 5 cd/m$^2$. Thus, as long as the luminance is in a range of 5 cd/m$^2$ and 200 cd/m$^2$, the observer does not see glare, thereby realizing both sufficient visibility and low power consumption in the transmitting mode.

Further, in the present embodiment, since there is provided the fluorescence scattering layer 23 for converting the wavelength of the light emitted by the LED 21 into white light, even in the case of adopting a light-emitting diode which emits light other than white light as in the present embodiment, it is possible to obtain white light which is required for illumination. Note that, although it is possible to adopt a light-emitting diode which emits light other than blue light, considering the conversion efficiency into white light in the fluorescence scattering layer 23, it is desirable to adopt a light-emitting diode which emits blue light.

Note that, it is possible to adopt the white plate light source 2' adopted in the second embodiment not only in the semitransmitting-type liquid crystal display device as in the present embodiment but also in the transmitting-type liquid crystal display device. In the case of adopting the white plate light source 2' in the transmitting-type liquid crystal display device, the same effect as obtained in the present embodiment can be obtained.

Also note that, in the first and second embodiment, the cool cathode fluorescent tube 8 and the LED 21 are adopted as the illuminating means, respectively. However, the same effect as obtained in the present embodiment can be obtained by adopting an EL (electroluminescence) light-emitting element, etc. In this case, a thinner and lighter liquid crystal display device can be obtained than the case of adopting the cool cathode fluorescent tube or a light-emitting diode as the illuminating means.

Also, in the first and second embodiment, the MIM elements are adopted as the active elements. However, the elements are not limited to the specified one, but the two-terminal non-linear resistance elements such as a varistor and a diode ring may be adopted.

Further, in the first and second embodiment, the two-terminal non-linear resistance elements such as the MIM elements are adopted as the active elements. However, the three-terminal non-linear resistance elements such as thin film transistors (hereinafter referred to as TFTs) having a structure wherein, for example, a thin insulating layer is covered with a semiconductive thin film may be adopted. In this case, the liquid crystal cell 1 has the following structure.

As shown in FIG. 10, on the liquid crystal layer 5 side of the upper glass substrate 3, there are provided (1) the plurality of transparent electrodes 31 (first transparent electrodes) provided in a form of matrix, (2) the signal electrodes 32 and scanning electrodes 35 for supplying a charge to the plurality of transparent electrodes 31, (3) and a plurality of three-terminal non-linear resistance elements 36 (active elements) for switching continuity and discontinuity between (a) the plurality of transparent electrodes 31 and (b) the pluralities of the signal electrodes 32 and the scanning electrodes 35. On the lower glass substrate 4, there is provided a transparent counter electrode 42 (second transparent electrode) facing the transparent electrodes 31. Note that, it is possible to change the respective positions of the upper glass substrate 3 and the lower glass substrate 4.

Also, conventionally, an active-matrix-type liquid crystal panel wherein switching elements such as the aforementioned TFTs are provided to each pixel has been under extensive research, yet due to its complex structure, such a liquid crystal display device has a low numerical aperture, making the device expensive. For this reason, in the case of adopting the liquid crystal panel in the semitransmitting-type liquid crystal display device which is used mostly in personal portable information terminals, such problems are presented in that the display becomes dark and the cost of the device is greatly increased. This makes the device not suitable for individual use. However, in recent years, such problems of the low numerical aperture and the high cost are beginning to be overcome such that the occurrence of the dark display is suppressed and the cost of the device is prevented from greatly increasing.

As described, the liquid crystal display device of the present invention is characterized in that, preferably, the contrast of the liquid crystal panel is not less than 10 when the illuminating means is not lighted, whereas the contrast of the liquid crystal panel is not less than 3 when the illuminating means is lighted.

With this arrangement, it is possible to ensure a minimum visibility required for recognizing a display both in the transmitting mode and the reflecting mode.

Also, the liquid crystal display device of the present invention is characterized in that, preferably, the contrast of the liquid crystal panel is not less than 20 when the illuminating means is not lighted, whereas the contrast of the liquid crystal panel is not less than 10 when the illuminating means is lighted.

With this arrangement, it is possible to ensure further desirable visibility both in the transmitting mode and the reflecting mode.

Further, the liquid crystal display device of the present invention is characterized in that, preferably, luminance of the displaying surface of the liquid crystal panel is in a range of not less than 5 $cd/m^2$ and not more than 200 $cd/m^2$ when the illuminating means is lighted.

With this arrangement, when the observer reads, for example, displayed characters without an effort, the minimum luminance required on the displaying surface of the liquid crystal panel is not less than 5 $cd/m^2$. Since it is possible to use the surrounding light as reflecting illumination even when the illuminating means is lighted, in the transmitting mode, sufficient visibility can be obtained even when the luminance of the illuminating means is not more than 200 $cd/m^2$. Also, since the luminance of the illuminating means is not more than 200 $cd/m^2$, the observer does not see glare. Thus, by taking the luminance of the front surface of the liquid crystal panel in the range of not less than 5 $cd/m^2$ and not more than 200 $cd/m^2$, it is possible to reduce the power consumption of the illuminating means while maintaining desired visibility.

Further, the liquid crystal display device of the present invention is characterized in that, preferably, the illuminating means is a light-emitting diode.

With this arrangement, since the illuminating means is a light-emitting diode which emits light under direct current, it is not required to provide an inverter for converting the direct current to the alternating current, and the conversion loss by the inverter is not generated. Thus, by adopting the light-emitting diode as the illuminating means, the power consumption can be reduced.

With this arrangement, because the high pressure and high frequency are not generated, the possibility of (1) a noise adversely affecting peripheral components and (2) fuming and firing can be lowered. Further, since it is not required to provide the inverter, it is possible to make it small the outside dimension of the entire system provided with the liquid crystal display device. Thus, with the described arrangement, it is possible to realize a high quality, low power consuming, and space saving semitransmitting-type liquid crystal display device.

Further, the liquid crystal display device of the present invention is characterized by including, preferably, wavelength converting means for converting the wavelength of light emitted from the light-emitting diode into white light.

With this arrangement, in the case of adopting, for example, a light-emitting diode which emits blue light, the wavelength of the blue light emitted by this light-emitting diode is converted into white light. Thus, because the liquid crystal display device is provided with the wavelength converting means, it is possible to obtain white light which is required for illumination even in the case of adopting a light-emitting diode which emits light other than white light.

Further, the liquid crystal display device of the present invention is characterized in that, preferably, the illuminating means is an electroluminescence light-emitting element.

With this arrangement, since the illuminating means is also an electroluminescence light-emitting element, it is possible to obtain a thinner and lighter liquid crystal display device than the case of adopting illuminating means composed of, for example, the cool cathode fluorescent tube or the light-emitting diode.

Further, the liquid crystal display device of the present invention is characterized in that, preferably, the active elements have a metal-insulator-metal structure.

With this arrangement, since the MIM elements having a metal-insulator-metal structure are adopted as the active elements, higher contrast can be obtained than the semitransmitting-type liquid crystal display device adopting the STN system, thereby permitting to realize a semitransmitting-type liquid crystal display device having desirable visibility.

Further, the liquid crystal display device of the present invention is characterized in that, preferably, each of the active elements is a thin film transistor.

With this arrangement, since each of the active elements is a thin film transistor, higher contrast can be obtained than the semitransmitting-type liquid crystal display device adopting the STN system, thereby permitting to realize a semitransmitting-type liquid crystal display device having desirable visibility.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device, comprising:

a liquid crystal panel including (1) a first substrate having first transparent electrodes provided in a form of matrix, (2) a second substrate, having second transparent electrodes, provided so as to face the first substrate, and (3) a liquid crystal layer sandwiched between the first substrate and the second substrate;

a polarizing plate-equipped semitransmitting reflecting plate provided on a side opposite to a displaying surface of said liquid crystal panel; and illuminating means for illuminating said liquid crystal panel through said polarizing plate-equipped semitransmitting reflecting plate, wherein said liquid crystal panel includes active elements which control supplying of a charge to the first transparent electrodes by their switching, and reflectance and transmittance of said polarizing plate-equipped semitransmitting reflecting plate are set so as to make contrast of said liquid crystal panel higher when said illuminating means is not lighted than when said illuminating means is lighted.

2. The liquid crystal display device as set forth in claim 1, wherein the contrast of said liquid crystal panel is not less than 10 when said illuminating means is not lighted, whereas the contrast of said liquid crystal panel is not less than 3 when said illuminating means is lighted.

3. The liquid crystal display device as set forth in claim 1, wherein the contrast of said liquid crystal panel is not less than 20 when said illuminating means is not lighted, whereas the contrast of said liquid crystal panel is not less than 10 when said illuminating means is lighted.

4. The liquid crystal display device as set forth in claim 1, wherein luminance of the displaying surface of said liquid crystal panel is in a range of not less than 5 $cd/m^2$ and not more than 200 $cd/m^2$ when said illuminating means is lighted.

5. The liquid crystal display device as set forth in claim 1, wherein said illuminating means is a light-emitting diode.

6. The liquid crystal display device as set forth in claim 5, further comprising wavelength converting means for converting into white light a wavelength of light emitted from said light-emitting diode.

7. The liquid crystal display device as set forth in claim 6, wherein said wavelength converting means is made of a fluorescent substance which emits fluorescence upon activation by the light emitted by said light-emitting diode, and a white substance which scatters the fluorescence.

8. The liquid crystal display device as set forth in claim 6, wherein said light-emitting diode emits blue light.

9. The liquid crystal display device as set forth in claim 1, wherein said illuminating means is an electroluminescence light-emitting element.

10. The liquid crystal display device as set forth in claim 1, wherein the active elements have a metal-insulator-metal structure.

11. The liquid crystal display device as set forth in claim 1, wherein each of the active elements is a thin film transistor.

12. The liquid crystal display device as set forth in claim 1, wherein said illuminating means is a cool cathode fluorescent tube.

* * * * *